(12) United States Patent
Baldi

(10) Patent No.: US 6,547,151 B1
(45) Date of Patent: Apr. 15, 2003

(54) CURRENCY NOTE COMPRISING AN INTEGRATED CIRCUIT

(75) Inventor: Livio Baldi, Agrate Brianza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 83 days.

(21) Appl. No.: 09/645,008

(22) Filed: Aug. 23, 2000

Related U.S. Application Data

(63) Continuation of application No. 09/158,653, filed on Sep. 22, 1998.

(30) Foreign Application Priority Data

Sep. 23, 1997 (EP) .............................................. 97830464

(51) Int. Cl.⁷ .............................................. G06K 19/06
(52) U.S. Cl. ........................ 235/492; 235/379; 283/57
(58) Field of Search ................. 235/379, 380, 235/492, 487; 283/57, 58, 59, 82, 83

(56) References Cited

U.S. PATENT DOCUMENTS

| | | | | |
|---|---|---|---|---|
| 4,472,627 A | | 9/1984 | Weinberger ................ 235/487 |
| 4,609,207 A | | 9/1986 | Muck et al. ................. 283/70 |
| 4,763,927 A | * | 8/1988 | Schneider .................... 283/70 |
| 4,783,646 A | | 11/1988 | Matsuzaki ................. 340/572 |
| 5,341,428 A | * | 8/1994 | Schatz ........................ 235/379 |
| 5,537,105 A | | 7/1996 | Marsh et al. .......... 340/825.54 |
| 5,545,885 A | | 8/1996 | Janielinski .................. 235/449 |
| 5,566,441 A | | 10/1996 | Marsh et al. .................. 29/600 |
| 5,850,524 A | * | 12/1998 | Lamla et al. .......... 395/200.61 |
| 5,880,934 A | | 3/1999 | Haghiri-Tehrani .......... 361/737 |
| 5,888,624 A | | 3/1999 | Haghiri et al. .............. 428/195 |
| 5,917,178 A | * | 6/1999 | De Hoog ..................... 235/492 |
| 5,984,190 A | * | 11/1999 | Nevill ......................... 235/492 |
| 6,050,494 A | * | 4/2000 | Song et al. ................. 235/492 |
| 6,111,506 A | * | 8/2000 | Yap et al. ................. 340/572.1 |
| 6,209,098 B1 | * | 3/2001 | Davis ........................ 380/284 |

FOREIGN PATENT DOCUMENTS

| | | | | |
|---|---|---|---|---|
| EP | 0 019 191 A1 | 11/1980 | ............ D21H/5/10 |
| JP | 2000353206 | * | 6/1999 | ............ G06K/19/00 |

OTHER PUBLICATIONS

"Currency With an Integrated Chip," IBM Technical Disclosure Bulletin, vol. 32 No. 5A, Oct. 1989, p. 427.

* cited by examiner

Primary Examiner—Daniel St.Cyr
(74) Attorney, Agent, or Firm—Allen, Dyer, Doppelt, Milbrath & Gilchrist, P.A.; Lisa K. Jorgenson

(57) ABSTRACT

A currency note includes an identification and/or authentication element including an integrated circuit. The integrated circuit can store, securely in electronic form and accessible from outside, such information as: the value, serial number, issuer, and date of issuance.

69 Claims, 3 Drawing Sheets

Fig.1  BN  C1  IC  C2
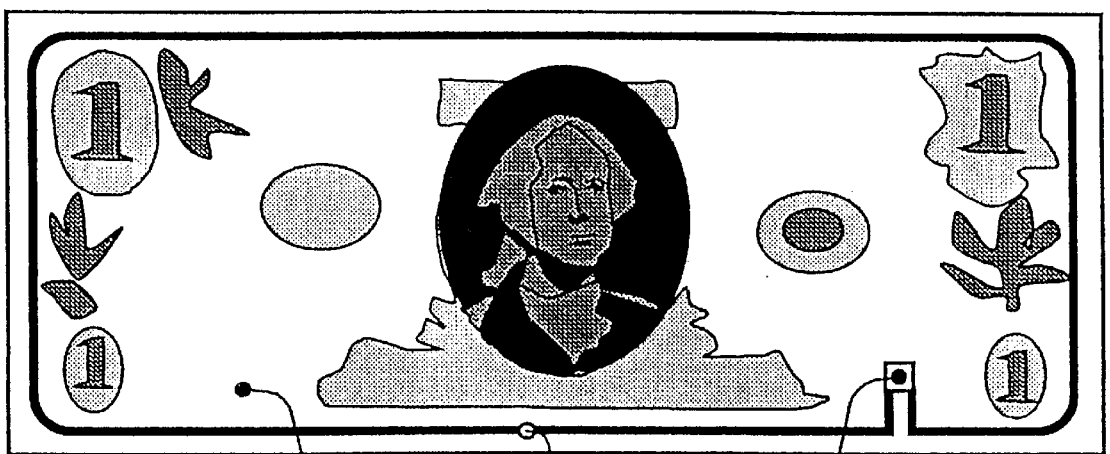
Fig.2  BN  LP  IC
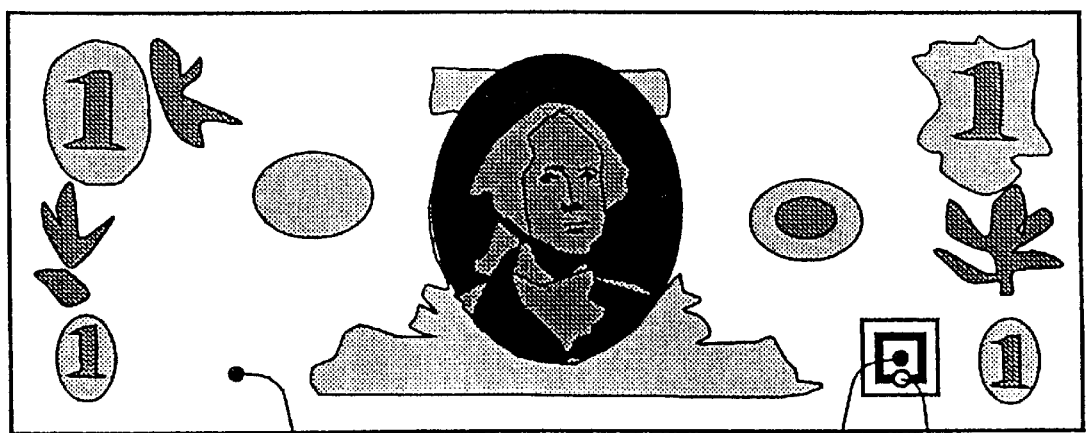
Fig.3  BN  IC  ANT

CURRENCY NOTE COMPRISING AN INTEGRATED CIRCUIT

RELATED APPLICATION

The present application is a continuation of U.S. patent application, Ser. No. 09/158,653, filed Sep. 22, 1998.

FIELD OF THE INVENTION

This invention relates to currency notes incorporating an identification and/or authentication element.

BACKGROUND OF THE INVENTION

The identification and authentication of currency notes, such as banknotes, checks, stocks, and bonds, is a long-standing problem. Reference will be made hereinafter to banknotes, although the invention is not limited thereto. Little has been achieved in the direction of banknote identification, besides the overprinting of serial numbers. Invisible paint markings have been used occasionally for ransom payments.

On the other hand, much has been done to have banknotes authenticated, in an effort to defeat an alert counterfeiting industry. Among the techniques adopted are: the use of special papers, special inks and special patterns, the inclusion of watermarks and the inclusion of plastics, metal or magnetic strips. Some of these techniques are described in U.S. Pat. Nos. 4,462,866; 4,652,015; 4,943,093; and 5,161,829, incorporated herein in their entirety by reference. All these techniques have the disadvantage of being either easily forged or difficult to authenticate by the general public and by bank personnel.

SUMMARY OF THE INVENTION

It is the object of this invention to provide a currency note which is more secure and easy to identify and/or authenticate.

This object is achieved by a currency note including, as an identifying and/or authenticating element, an integrated circuit applied to or embedded in the note.

BRIEF DESCRIPTION OF THE DRAWINGS

The invention can be more clearly understood by reading the following description in conjunction with the accompanying drawings, wherein:

FIGS. 1, 2 and 3 respectively show three different banknotes according to the invention;

DETAILED DESCRIPTION OF THE PREFERRED EMBODIMENTS

Figure 4:
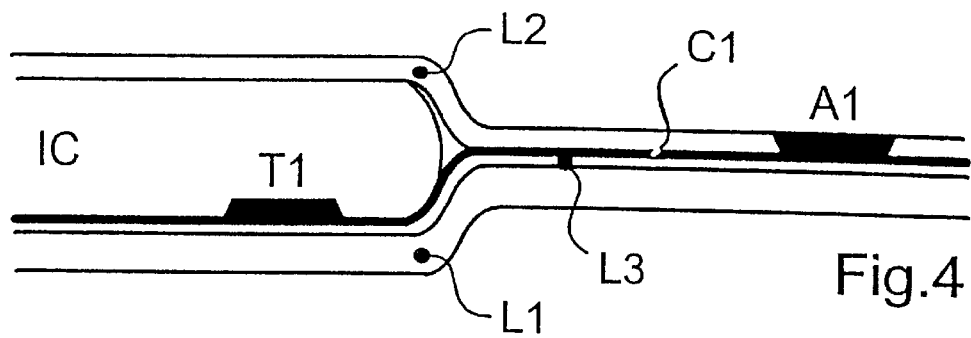
FIGS. 4, 5, 6, 7 and 8 show respective cross-sectional views taken through five different banknotes according to the invention at the location of the integrated circuit.

The use of integrated circuits applied on a substrate, such as an adhesive label, for the purpose of identifying objects, e.g. articles in a supermarket, is known under the trademark "Supertag", and described in U.S. Pat. No. 5,566,441. U.S. Pat. No. 5,537,105 describes, on the other hand, a corresponding RFID (Radio Frequency Identification) system. This system comprises an interrogator and a plurality of passive transponders equipped with an antenna and having the integrated circuit for their electrical core piece. U.S. Pat. Nos. 5,537,105 and 5,566,441 are incorporated herein in their entirety by reference.

The use of integrated circuits for identifying (bank, telephone, etc.) credit accounts and their owners is known from the use of smart cards. Early smart cards had contacts, but contact-less cards have been introduced more recently. Extensive technical and patent literature is available covering the electronic, chemical and mechanical aspects of such cards.

However, integrated circuits have never been used for the purpose of identifying or authenticating currency notes, as provided by this invention, nor have the implications of such been heeded heretofore. FIGS. 1, 2 and 3 show three different embodiments of a banknote BN according to the invention, which banknote incorporates an integrated circuit IC as its identifying and/or authenticating element. Alternatively, two or more integrated circuits could be interconnected within each banknote, although this choice would be less advantageous due to the difficulty of establishing a large number of electric connections within a banknote.

The integrated circuit IC stores information that can be read by a suitable authentication apparatus external to the banknote BN, in a similar manner to the aforementioned "Supertag" system and contact or contact-less smart cards. The items of information stored by the integrated circuit may be, for example, a real or par value, identity, date of issuance, and issuer of the note. This information may also appear in print on the note, more or less as in current practice. Based on such information, the note can be readily identified, even in an automatic manner.

In addition, the very presence of an integrated circuit capable of transmitting predetermined response signals in response to predetermined interrogation signals represents an effective authentication element. In fact, integrated circuits are not articles that can be fabricated at the beginner level, and surely not at a low cost. If required, however, measures can be taken to discourage too easy a replication of the integrated circuit, and some such measures have already been proposed and/or adopted for smart cards.

In the embodiment of FIG. 3, the integrated circuit IC has no terminals, and includes an integrated antenna ANT, which may be a loop of a conductive material formed in the peripheral region of the integrated circuit. The word "terminals" means here areas of the integrated circuit which are prearranged for electrically connecting the integrated circuit to external electric and/or electronic circuits. In this case, the interrogation and response signals are RF signals, and accordingly, the integrated circuit IC is to include suitable circuitry for receiving and transmitting them, and capable of being self-powered by RF power, similar to the integrated circuits of contact-less smart cards.

Figure 9:
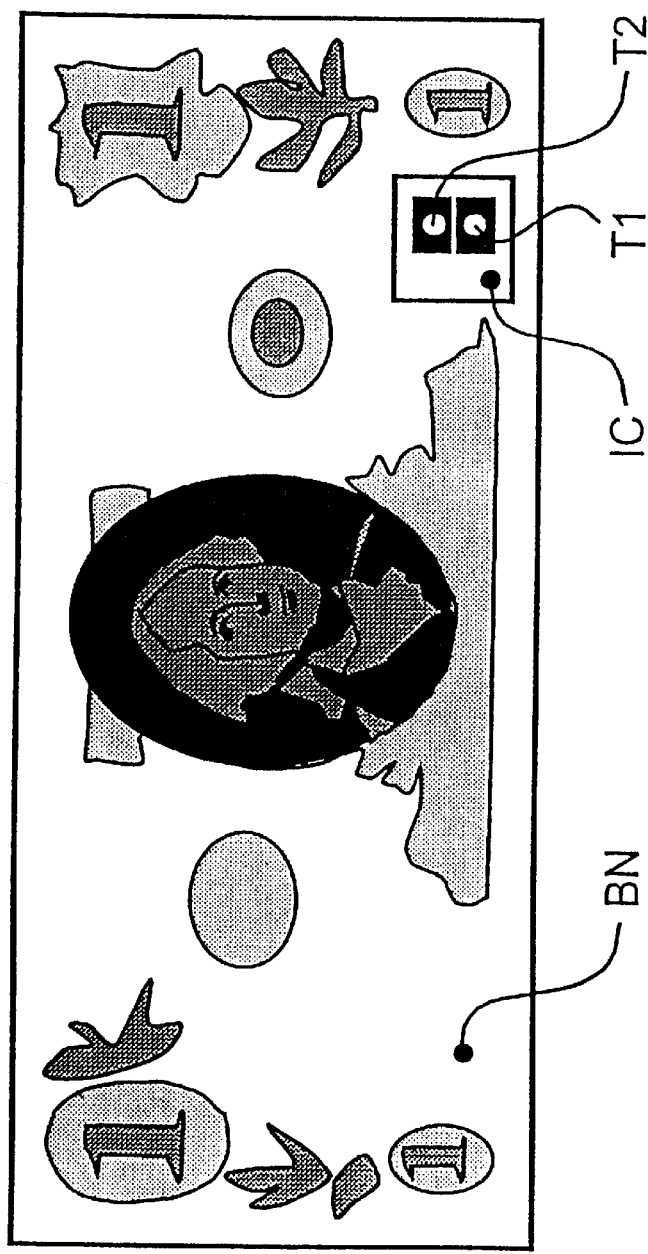
FIG. 9 shows a fourth banknote according to the invention.

In the embodiments of FIGS. 1, 2 and 9, the integrated circuit IC has two terminals T1 and T2, not shown, in FIGS. 1 and 2. These terminals may be provided on one face or on opposite faces of the integrated circuit IC. Two terminals are a minimum for establishing between two electric systems a bi-directional transmission of informational signals and a one-way transmission of power. Of course, the integrated circuit IC may be provided with plural terminals. In general, this would bring about a simplification in the circuitry within the integrated circuit IC, but also a complication in the construction of the banknote BN.

In the embodiments of FIGS. 1 and 2, the banknote BN also includes an antenna which is connected to the terminals T1 and T2. Of course, the integrated circuit IC and/or the banknote BN could be provided with a receiving antenna and a transmitting antenna, although this would involve added complexity and cost.

In the embodiment of FIG. 1, the antenna comprises two electrical conductors C1 and C2 connected to the terminals T1 and T2, respectively, and embedded in the note. Accordingly, the antenna is an open dipole. This is similar to the arrangement provided in the "Supertag" system.

In the embodiment of FIG. 2, the antenna includes a loop LP formed from an electric conductor which has its two ends connected to the terminals T1 and T2 and is embedded in the note. Accordingly, this antenna is a closed dipole. The loop can also be said to form the secondary winding of an air-core transformer having its primary winding placed within the authentication apparatus. This is similar to the arrangement provided for contact-less smart cards.

Whereas the absence of contacts is a definite advantage with smart cards, this may not always be so in the instance of banknotes. In fact, the availability of at least two contacts on the banknote, for communicating with and powering the integrated circuit IC, allows the layout of the latter to be simplified and its cost reduced. This constitutes a critical factor in such an application. Furthermore, the occasions when a banknote is to be positively authenticated are far less frequent than in the operation of a smart card, and therefore, the inconvenience represented by the electrical contact is less of a penalty.

For the purpose, the banknote BN may additionally include two electrical conductors C1 and C2 connected electrically to the terminals T1 and T2, and having two external contact pads A1 and A2, respectively. These pads may be on the same face or different faces of the banknote BN, and in other embodiments, located at an edge thereof.

Alternatively, the terminals T1 and T2 of the integrated circuit IC could be made accessible directly from outside the banknote BN for electrical contacting, as in the embodiment of FIG. 9. The terminals might be located on and be accessed from different sides of the banknote BN. In either of these cases where the banknote BN is provided with external contact pads, the integrated circuit IC layout can be similar to that of a smart card "with contacts".

The electrical conductors C1, C2, LP can be formed in the banknote by any of several methods. They may be printed in conductive ink, be thin wires embedded in the note, or be very thin (e.g. 300 Å thick) metal strips deposited onto thin (e.g. 10 µm thick) plastic strips embedded in the note. Among the most critical factors to a large-scale implementation of this invention are the cost of the integrated circuit, more generally of the banknote, and the thickness dimension of the integrated circuit.

The cost of the security device, i.e. the integrated circuit, ought to be related to the denomination of the note (banknote, check, bill, bond, etc.). For example, the cost of a fairly simple integrated circuit may amount to a half-dollar and, accordingly, it would seem reasonable to use the circuit for denominations upward of fifty dollars. Therefore, if the use of this invention is to be extended to include lower denominations, the primary considerations become: the use of inexpensive semiconductor manufacturing processes; an integrated circuit layout of small area, and hence simple circuitry, so that a semiconductor wafer can accommodate a large number of them; and the adoption of very large volume manufacturing methods.

For the banknote to be easy to handle, the thickness of the insert including the integrated circuit should not exceed that of standard banknote paper. To quote, standard sheet paper for office use is 30 to 60 µm thick, ply paper for banknote printing has a thickness of 50 to 100 µm, thin opaque or transparent sheet plastics may range in thickness from 8 to 15 µm, and the thickness of an integrated circuit for smart cards is approximately 180 µm.

Thus, a suitable thickness for the integrated circuit in this invention would be less than 100 µm, preferably less than 50 µm. For example, using the CMP (Chemical Mechanical Polishing) method, the thickness of the silicon die has been cut down to 40 µm in the lab, without damaging any of the circuitry included in the integrated circuits that form the chip.

Some embodiments of a banknote according to the invention will now be described with the aid of sectional views thereof. These sectional views are taken at the locations of the integrated circuit IC, and of the conductors C1, C2, LP, where provided. The banknote construction obviously is simpler elsewhere.

In FIG. 4, the banknote comprises a first sheet paper layer L1 and a second sheet paper layer L2 overlying the first. Sandwiched between these layers is the integrated circuit IC provided with (visible) T1 and (invisible) T2 terminals. Also sandwiched between the layers L1 and L2 are a thin plastic layer L3 and a very thin metal layer, deposited over the layer L3 that forms the conductor C1. The conductor C1 has a contact pad A1 which appears at the surface of the layer L2 and contacts the terminal T1.

Figure 5:
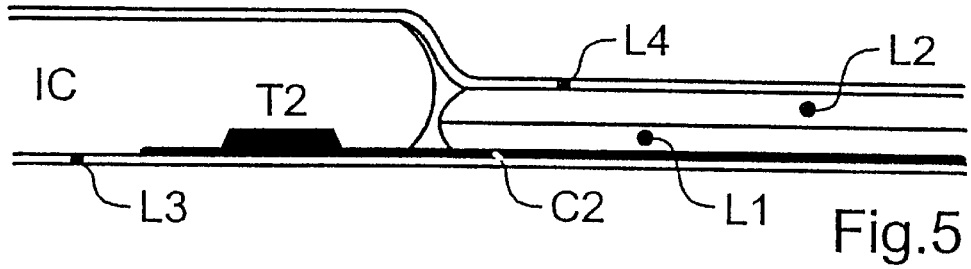

In FIG. 5, the banknote comprises first L1 and second L2 overlapping sheet paper layers, and first L3 and second L4 thin plastic layers which are apertured at the integrated circuit IC. A very thin metal layer is deposited onto the layer L3 and forms the conductor C2. The integrated circuit IC is sandwiched between the layers L3 and L4 and has (invisible) T1 and (visible) T2 terminals. FIG. 5 could be, for example, a cross-section through the banknote BN of FIG. 1.

Figure 6:
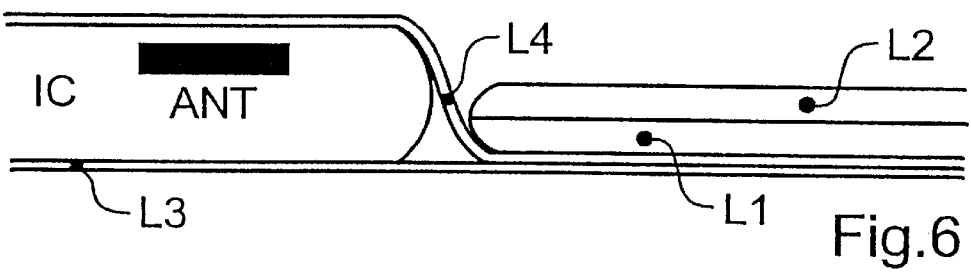

In FIG. 6, the banknote comprises first L3 and second L4 thin overlapping plastic layers, and first L1 and second L2 overlapping sheet paper layers. The layers L1 and L2 overlie the layers L3 and L4. The 15 layers L1 and L2 are apertured at the integrated circuit IC. The integrated circuit IC is sandwiched between the layers L3 and L4, and provided with an integrated antenna ANT. FIG. 6 could be, for example, a cross-section through the banknote BN of FIG. 3.

Figure 7:
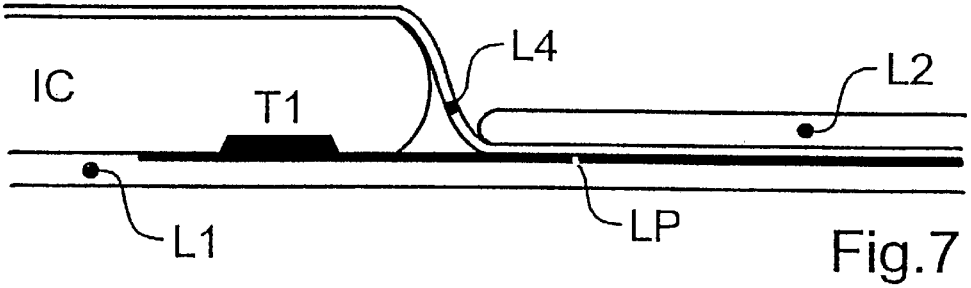

In FIG. 7, the banknote comprises first L1 and second L2 overlapping sheet paper layers, and a thin plastic layer L4 placed between the layers L1 and L2. The layer L2 is apertured at the integrated circuit IC. The integrated circuit IC is placed between the layers L1 and L4 and provided with (visible) T1 and (invisible) T2 terminals. Printed in conductive ink onto the layer L1 is a loop LP in contact with the terminals T1 and T2. FIG. 7 could be, for example, a cross-section through the banknote BN of FIG. 2.

Figure 8:
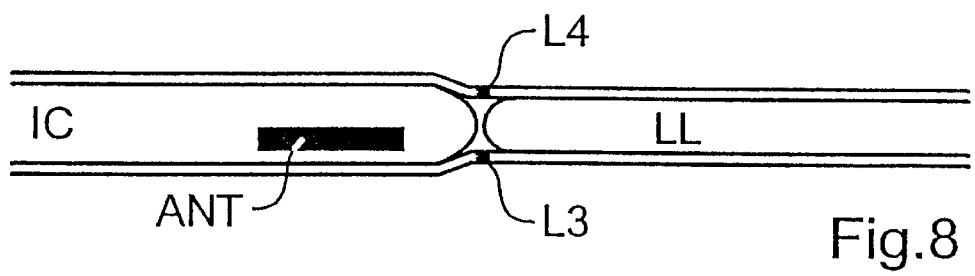

In FIG. 8, the banknote comprises a single sheet paper layer LL, and first L3 and second L4 thin plastic layers enclosing it. The layer LL is apertured at the integrated circuit IC. The integrated circuit IC is placed between the layers L3 and L4 and provided with an integrated antenna ANT. FIG. 8 could be, for example, a cross-section through the banknote BN of FIG. 3.

Figure 10:
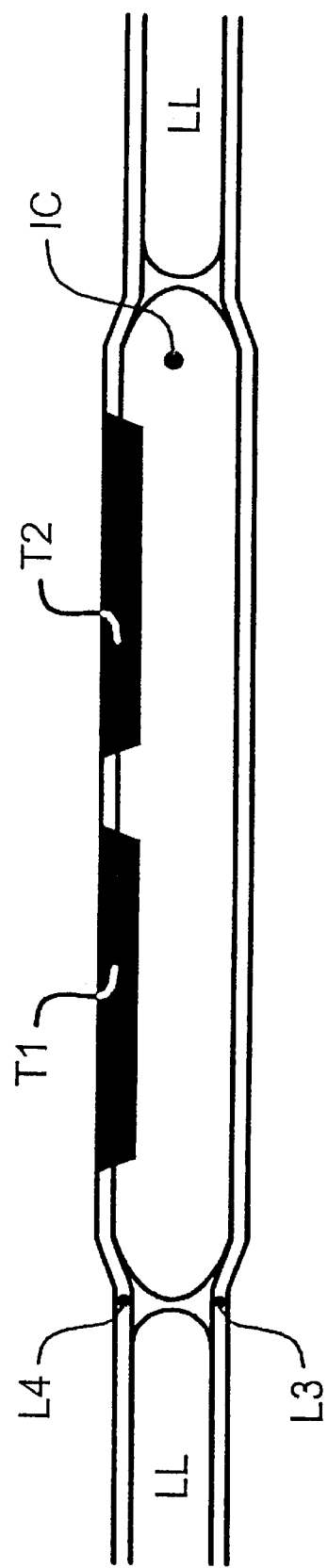
FIG. 10 is a vertical cross-sectional view taken through the banknote of FIG. 9 at the location of the integrated circuit.

In FIG. 10, the banknote comprises a single sheet paper layer LL, and first L3 and second L4 thin plastic layers enclosing it. The layer LL is apertured at the integrated circuit IC. The integrated circuit IC is placed between the layers L3 and L4 and provided with two terminals T1 and T2 which appear at the surface of the layer L4 and, therefore, can be accessed directly from outside the banknote BN for electrical contact purposes. FIG. 10 is a cross-section through the banknote BN of FIG. 9.

In all of the above embodiments, the integrated circuit IC is fully isolated from the note exterior. In general, the integrated circuit IC should be provided with suitable passivation layers to protect and seal it at least from moisture.

As previously mentioned, the information that can be stored in the integrated circuit IC is, for example, a real or par value, the identity, the issuer, and the date of issuance of the note. The integrated circuit IC may be adapted to store this and/or other elements of information in an encrypted form, such as read and/or write passwords. Thus, the authentication operation corresponds to reading the information from the integrated circuit and checking it for correctness in an automatic or manual manner. The reading may be free or subordinate to the integrated circuit receiving a read password.

Of course, such information has been preliminarily recorded in the integrated circuit. This can be done either by the manufacturer of the integrated circuit or the issuer or a distributor acting on behalf of the issuer (e.g., a bank branch office). The recording of information could be effected, if desired, by a number of entities at different stages. Each entity would typically enter information of its own province.

In view of the low-cost fabrication of integrated circuits at the beginner or neophyte level being virtually impossible, forgers may be expected to attempt the removal of integrated circuits from low denomination notes, altering the information stored therein, and transferring them to forged notes of higher denomination.

To prevent forgers from tampering with stored information, it can be arranged for the integrated circuit to request a password before information can be written thereinto. In a simpler way, the integrated circuit may be provided with a non-volatile memory which can be programmed only once, that is by an irreversible physical action. Such a memory could be selected from ROMs, PROMs, UPROMs or CAMs or fused memories, EPROMs without erase windows or EEPROMs without erase circuits, in decreasing order of security level. Another factor not to be overlooked is ease of programming. ROMs can only be factory programmed (so that each note must be provided with an individually different integrated circuit), while PROMs and EPROMs require high program voltages. The manufacturing cost of the integrated circuit is also a factor.

An alternative choice would be to provide the integrated circuit with a non-volatile memory for storing identity information, and with a security circuit having a non-erasable (i.e. programmable only once) memory, such as a fused memory, and being effective to inhibit programming of the non-volatile memory in relation to the contents of the non-erasable memory. In this case, the following procedure may be used. Each time that the integrated circuit receives a program command, it checks the non-erasable memory for its contents: if these contents reveal that the nonvolatile memory has already been programmed, the program command is not executed; otherwise, the command is executed, and the contents of the non-erasable memory are set to prevent future re-programming. This safeguard against re-programming may be provided for segments rather than the whole memory.

To avoid interference on the stored information, and physical attack (by radiation or thermal treatment), the possibilities offered by electrically re-programming, e.g. bits not yet programmed within an already programmed byte should not be overlooked. A way of solving this problem systematically is to have the information to be stored suitably encoded. For example, by arranging for two bits to be stored by the code "zero" →"01" and "one"→"10", to correspond to each information bit, it would become impossible to turn a "zero" into a "one", or a "one" into a "zero", by any operations attempted on the memory after the initial programming operation.

A second non-volatile memory, with reduced or no protection, could be provided additionally to a fully safeguarded non-volatile memory, e.g. for bank branch offices to record information in a banknote. For example, the first memory might be of the fused type and the second memory be either safeguarded by means of a write password or be freely programmable.

This can also be achieved with a single memory array divided into two or more segments. For example, the non-erasable memory may be adapted to store a plurality of bits, each bit being associated with a different memory segment, and some of these bits having fixed informational contents to indicate that the segment is freely programmable, while other bits would have varying informational contents as previously explained. Of course, all of the technological and economical considerations submitted herein above would be subject to continual evolution.

That which is claimed is:

1. A currency note having a face value and comprising:
   a currency note substrate and indicia thereon of the face value of the currency note; and
   at least one integrated circuit for storing information relating to the face value of the currency note and carried by said currency note substrate as at least one of an identification and an authentication element of the currency note.

2. A currency note according to claim 1, wherein said at least one integrated circuit comprises an integrated antenna.

3. A currency note according to claim 2, wherein said at least one integrated circuit is devoid of terminals.

4. A currency note according to claim 1, wherein said at least one integrated circuit comprises a plurality of terminals.

5. A currency note according to claim 4, further comprising an antenna connected to said plurality of terminals.

6. A currency note according to claim 5, wherein said antenna comprises two electrical conductors embedded in said currency note substrate.

7. A currency note according to claim 5, wherein said antenna comprises an electrically conductive loop embedded in said currency note substrate.

8. A currency note according to claim 5, further comprising a plurality of electrical conductors comprising external contact pads and being connected to respective terminals.

9. A currency note according to claim 5, wherein said plurality of terminals are accessible directly from outside the currency note substrate for electrical contacting purposes.

10. A currency note according to claim 1, wherein said at least one integrated circuit has a thickness less than about 100 $\mu$m.

11. A currency note according to claim 1, wherein said at least one integrated circuit has a thickness less than about 50 $\mu$m.

12. A currency note according to claim 1, wherein said at least one integrated circuit is adapted to store information relating to an identity of the currency note.

13. A currency note according to claim 1, wherein said at least one integrated circuit is adapted to store information relating to an issuer of the currency note.

14. A currency note according to claim 1, wherein said at least one integrated circuit is adapted to store information relating to a date of issuance of the currency note.

15. A currency note according to claim 1, wherein said at least one integrated circuit is adapted to store different elements of information at different times.

16. A currency note according to claim 1, wherein said at least one integrated circuit comprises a non-volatile memory.

17. A currency note according to claim 1, wherein said at least one integrated circuit comprises a non-volatile memory programmable only once.

18. A currency note according to claim 17, wherein said non-volatile memory comprises at least one of a read only memory (ROM), programmable read only memory (PROM), a fused memory, an electrically programmable read only memory (EPROM) without an erase window, and an electrically erasable programmable read only memory (EEPROM) without erase circuitry.

19. A currency note according to claim 1, wherein said at least one integrated circuit comprises:
    a non-volatile memory for storing information; and
    a security circuit comprising a non-erasable memory for inhibiting programming of said non-volatile memory in relation to information stored in said non-erasable memory.

20. A currency note according to claim 1, wherein said currency note substrate comprises at least one flexible layer.

21. A currency note-according to claim 20, wherein said at least one flexible layer comprises at least one paper layer.

22. A currency note according to claim 20, wherein said at least one flexible layer comprises at least one plastic layer.

23. A currency note according to claim 1, wherein the information stored in said at least one integrated circuit is encrypted.

24. A currency note having a face value and comprising:
    a currency note substrate and indicia thereon of the face value of the currency note; and
    at least one integrated circuit carried by said currency note substrate as at least one of an identification and an authentication element of the currency note, said at least one integrated circuit comprising an integrated antenna and being devoid of terminals and also storing information relating to the face value of the currency note.

25. A currency note according to claim 24, wherein said at least one integrated circuit has a thickness less than about 100 µm.

26. A currency note according to claim 24, wherein said at least one integrated circuit has a thickness less than about 50 µm.

27. A currency note according to claim 24, wherein said at least one integrated circuit comprises a non-volatile memory programmable only once.

28. A currency note according to claim 27, wherein said non-volatile memory comprises at least one of a read only memory (ROM), programmable read only memory (PROM), a fused memory, an electrically programmable read only memory (EPROM) without an erase window, and an electrically erasable programmable read only memory (EEPROM) without erase circuitry.

29. A currency note according to claim 24, wherein said at least one integrated circuit comprises:
    a non-volatile memory for storing information; and
    a security circuit comprising a non-erasable memory for inhibiting programming of said non-volatile memory in relation to information stored in said non-erasable memory.

30. A currency note according to claim 24, wherein said currency note substrate comprises at least one flexible layer.

31. A currency note according to claim 24, wherein the information stored in said at least one integrated circuit is encrypted.

32. A currency note having a face value and comprising:
    a currency note substrate and indicia thereon of the face value of the currency note, said currency note comprising at least one flexible layer; and
    at least one integrated circuit carried by said currency note substrate as at least one of an identification and an authentication element of the currency note, said at least one integrated circuit comprising a plurality of terminals and storing information relating to the face value of the currency note.

33. A currency note according to claim 32, further comprising an antenna connected to said plurality of terminals.

34. A currency note according to claim 33, wherein said antenna comprises two electrical conductors embedded in said currency note substrate.

35. A currency note according to claim 33, wherein said antenna comprises an electrically conductive loop embedded in said currency note substrate.

36. A currency note according to claim 32, further comprising a plurality of electrical conductors comprising external contact pads and being connected to respective terminals.

37. A currency note according to claim 32 wherein said plurality of terminals are accessible directly from outside the currency note substrate for electrical contacting purposes.

38. A currency note according to claim 32, wherein said at least one integrated circuit has a thickness less than about 100 µm.

39. A currency note according to claim 32, wherein said at least one integrated circuit has a thickness less than about 50 µm.

40. A currency note according to claim 32, wherein said at least one integrated circuit comprises a non-volatile memory programmable only once.

41. A currency note according to claim 40, wherein said non-volatile memory comprises at least one of a read only memory (ROM), programmable read only memory (PROM), a fused memory, an electrically programmable read only memory (EPROM) without an erase window, and an electrically erasable programmable read only memory (EEPROM) without erase circuitry.

42. A currency note according to claim 32, wherein said at least one integrated circuit comprises:
    a non-volatile memory for storing information; and
    a security circuit comprising a non-erasable memory for inhibiting programming of said non-volatile memory in relation to information stored in said non-erasable memory.

43. A currency note according to claim 32, wherein the information stored in said at least one integrated circuit is encrypted.

44. A method for making a currency note having a face value comprising:
    providing a currency note substrate having an indicia thereon of the face value of the currency note;
    mounting at least one integrated circuit to be carried by the currency note substrate as at least one of an identification and an authentication element of the currency note; and storing information relating to the face value of the currency note in the at least one integrated circuit.

45. A method according to claim 44, wherein the at least one integrated circuit comprises an integrated antenna.

46. A method according to claim 44, wherein the at least one integrated circuit comprises a plurality of terminals.

47. A method according to claim 44, wherein the at least one integrated circuit has a thickness less than about 100 µm.

48. A method according to claim 44, wherein the at least one integrated circuit has a thickness less than about 50 µm.

49. A method according to claim 44, wherein the information stored in the at least one integrated circuit is encrypted.

50. A method according to claim 44, wherein the at least one integrated circuit comprises a non-volatile memory programmable only once; and wherein the non-volatile memory comprises at least one of a read only memory (ROM), programmable read only memory (PROM), a fused memory, an electrically programmable read only memory (EPROM) without an erase window, and an electrically erasable programmable read only memory (EEPROM) without erase circuitry.

51. A currency note having a face value and comprising:
a currency note substrate and indicia thereon of the face value of the currency note; and
at least one integrated circuit for storing information relating to the face value of the currency note and carried by said currency note substrate as at least one of an identification and an authentication element of the currency note, said at least one integrated circuit comprising
a non-volatile memory for storing the information,
a security circuit comprising a non-erasable memory for inhibiting programming of said non-volatile memory in relation to the information stored in said non-erasable memory, and
an integrated antenna for providing remote access to the information without contact to the currency note.

52. A currency note according to claim 51 wherein said integrated antenna comprises two electrical conductors embedded in said currency note substrate.

53. A currency note according to claim 51 wherein said integrated antenna comprises an electrically conductive loop embedded in said currency note substrate.

54. A currency note according to claim 51 wherein said at least one integrated circuit has a thickness less than about 50 µm.

55. A currency note according to claim 51 wherein said at least one integrated circuit stores information relating to an identity of the currency note.

56. A currency note according to claim 51 wherein said at least one integrated circuit stores information relating to an issuer of the currency note.

57. A currency note according to claim 51 wherein said at least one integrated circuit stores information relating to a date of issuance of the currency note.

58. A currency note according to claim 51 wherein said at least one integrated circuit comprises a non-volatile memory for storing the information.

59. A currency note according to claim 58 wherein said non-volatile memory is programmable only once.

60. A currency note according to claim 59 wherein said non-volatile memory comprises at least one of a read only memory (ROM), programmable read only memory (PROM), a fused memory, an electrically programmable read only memory (EPROM) without an erase window, and an electrically erasable programmable read only memory (EEPROM) without erase circuitry.

61. A currency note according to claim 58 wherein said currency note substrate comprises at least one flexible layer.

62. A currency note according to claim 51, wherein the information stored in said at least one integrated circuit is encrypted.

63. A currency note having a face value and comprising:
a currency note substrate comprising at least one flexible layer and having an indicia thereon of the face value of the currency note; and
at least one integrated circuit for storing information relating to at least one of the face value of the currency note, an identity of the currency note, an issuer of the currency note, and a date of issuance of the currency note, said at least one integrated circuit being carried by said currency note substrate as at least one of an identification and an authentication element of the currency note, said at least one integrated circuit comprising
a non-volatile memory for storing the information, said non-volatile memory being programmable only once,
a security circuit comprising a non-erasable memory for inhibiting programming of said non-volatile memory in relation to the information stored in said non-erasable memory, and
an integrated antenna for providing remote access to the information without contact to the currency note.

64. A currency note according to claim 63 wherein said integrated antenna comprises two electrical conductors embedded in said currency note substrate.

65. A currency note according to claim 63 wherein said integrated antenna comprises an electrically conductive loop embedded in said currency note substrate.

66. A currency note according to claim 63 wherein said at least one integrated circuit has a thickness less than about 50 µm.

67. A currency note according to claim 63 wherein at least one flexible layer comprises at least one paper layer.

68. A currency note according to claim 63, wherein the information stored in said at least one integrated circuit is encrypted.

69. A currency note according to claim 63 wherein said non-volatile memory comprises at least one of a read only memory (ROM), programmable read only memory (PROM), a fused memory, an electrically programmable read only memory (EPROM) without an erase window, and an electrically erasable programmable read only memory (EEPROM) without erase circuitry.

* * * * *